United States Patent Office 3,492,927
Patented Feb. 3, 1970

3,492,927
PHOTOGRAPHIC CAMERA WITH EXPOSURE METER AND CONTROL DEVICE AND A FILM MAGAZINE
Heinz Thiele, Leinfelden, near Stuttgart, and Gerhard Borner, Musberg, near Boblingen, Germany, assignors to Zeiss Ikon Aktiengesellschaft, Stuttgart, Germany, a German corporation
Filed Feb. 27, 1967, Ser. No. 618,949
Claims priority, application Germany, Mar. 10, 1966, Z 12,085
Int. Cl. G01j 1/00, 1/52; G03b 19/04
U.S. Cl. 95—10
4 Claims

ABSTRACT OF THE DISCLOSURE

The film magazine to be inserted in a photographic camera equipped with an exposure meter controlling the exposure adjustment is provided with non-mechanical resistance means, namely an optical resistance in the form of reflector, diaphragm or filter, for introducing into the exposure meter a factor or value indicative of the characteristic of the film, such as the speed of the film, which is in the magazine.

---

The invention relates to a film magazine and a camera provided with an exposure measurement and an exposure control device, whereby the magazine is equipped with means for introducing film dependent control values into the exposure meter.

It has been proposed heretofore to provide a film magazine with marks which are mechanically engaged by the camera and which by their position furnish the exposure measurement and control device of the camera with information about the speed of the film in the magazine. The mechanism for engaging these marks is rather involved and expensive. In addition, the necessary manufacture tolerances give rise to adjustment inaccuracies.

Another film magazine is known which for the purpose of furnishing the control values is provided with at least one electrically conductive, preferably metallic surface arranged at a predetermined position which is associated with a predetermined control value. Contacts in the camera are bridged by these electrically conducting surfaces as soon as the magazine has been inserted in the camera. The exposure measurement and control circuit is closed by a resistance which is gauged to the speed of the film in the magazine and picked by the position of the conductive surface. A camera adapted to be used with such film magazines therefore requires as many resistances to be included in the exposure measurement and control circuit, respectively, as films are desired to be used.

This is hardly less complex than the mechanical engagement means which requires only one variable resistance.

The invention has as its object the creation of a device which permits in a simple manner and without mechanical means the exposure measurement and control device to be furnished with the required control values when inserting a film magazine into the camera.

This problem is solved according to the invention, in that a film magazine of the type described is provided with optical resistances to be incorporated in the exposure meter or control device of the camera, the magnitude of which represents a measure, for example of the film speed, and in that the camera is equipped to engage or contain these resistances.

According to the invention, as optical resistances are employed diaphragms, mirrors or filters insertable into a measuring light beam which pass through the space in which the film magazine is placed, whereby these optical resistances by their varying size or position or by their differing transmissivity or their different reflexion properties provide a measure for the film dependent values, such as the speed of the film.

When inserting the film magazine into such a camera, the optical resistance of the aforementioned type may be introduced by providing the film magazine with a reflecting surface in the region of one of its edges or corners whose size and inclination toward the photoelectric converter remain fixed but which may be offset with respect to the photoelectric converter in such manner that only a portion of the measuring light beam corresponding to the value to be introduced is reflected onto the receiving surface of the photoelectric converter.

The reflecting surface on the film magazine may, however, also be varied in its inclination toward the photoelectric converter and in this way may reflect only a portion of the measuring light beam onto the receiving surface which corresponds to the value to be introduced into the exposure control of the camera.

Finally, it is possible to vary the size of the above mentioned reflecting surface and reflect only that portion of the measuring light beam onto the receiving surface of the photoelectric converter which corresponds to the value to be introduced into the exposure measuring or control device of the camera.

It is further within the scope of the invention to arrange a diaphragm in the area of one of the edges or corners of the film magazine to cover or uncover a portion of the measuring light beam which is directed onto the receiving surface of the photoelectric converter, so that only a portion of the light corresponding to the value to be introduced reaches the exposure meter.

In similar manner a filter may be arranged in the range of an edge or corner of the film magazine, which filter is arranged in the path of a measuring light beam directed onto the receiving surface of a photoelectric converter when the magazine is inserted into the camera. Obviously, the reflecting surfaces which are arranged in the range of an edge of the film magazine may also be provided with different reflective power for the introduction of predetermined exposure-determining values.

The invention will be further described with reference to the accompanying drawings from which details of no consequence to the invention per se have been omitted for the sake of clarity.

Figure 1:
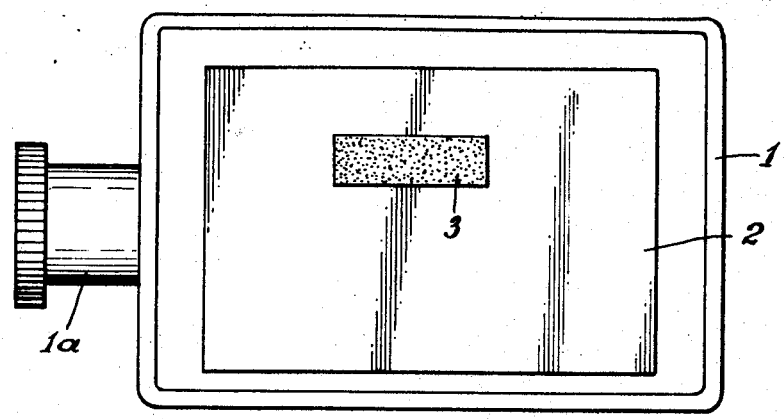
FIG. 1 is a diagrammatic elevation view of a film magazine provided with an electric resistance layer; and placed in a motion picture camera and having its cover removed.
Figure 2:
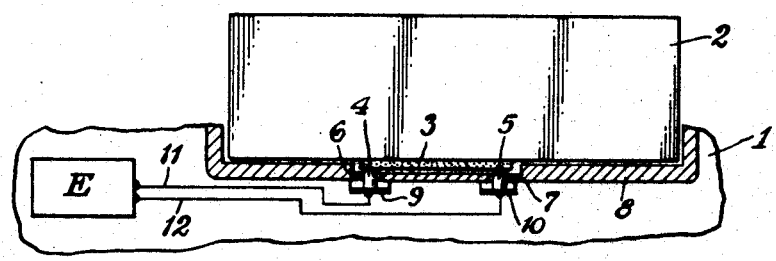
FIG. 2 is a top view of FIG. 1, partly in section.

Referring to FIGS. 1 and 2, the motion picture camera 1 has inserted therein a film magazine 2 having a resistance area 3 on one of its outer surfaces. Contacts 4 and 5 fixed to the camera 1 project through bores 6 and 7 in a wall 8 of the camera. The wall 8 forms one side of the space for the film magazine 2. The contacts 4 and 5 are supported by leaf springs 9 and 10. Electric conductors 11 and 12 lead from the contacts 4 and 5 to an exposure measuring and control device E of a conventional type.

When the film magazine 2 is inserted in the camera 1, the contacts 4 and 5 engage the resistance area 3 on the film magazine 2 and connect it by means of the electric conductors 11 and 12 to the measure circuit of the exposure measuring or control device, respectively. In this manner the chaarcteristic of the film which is to be considered during the exposure of the film, in the present case the film speed, is taken into account during the exposure measurement.

In the embodiments illustrated in FIGS. 3 to 9, optical resistances are employed for supplying predetermined film factors, for example the film speed, to the exposure control mechanism.

Figure 3:
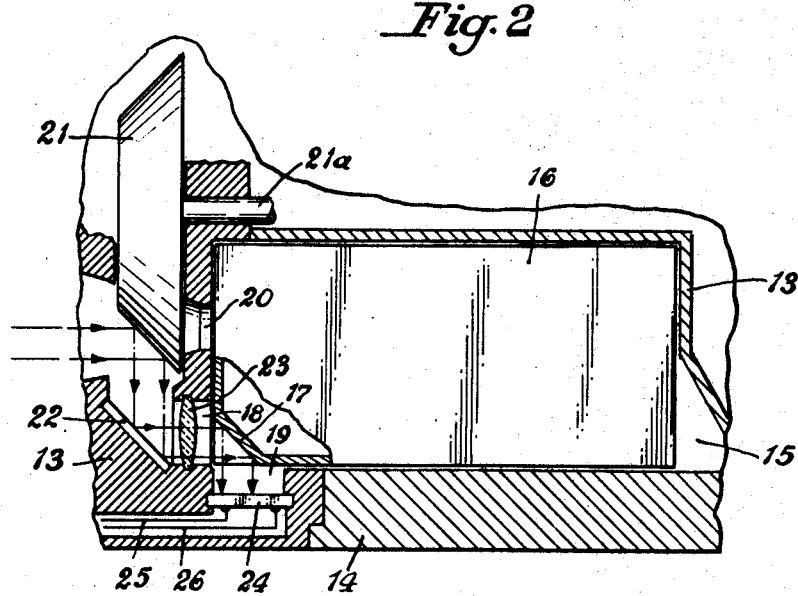
FIG. 3 is a sectional top view of part of a film camera with a film magazine inserted having a reflecting surface.
Figure 4:
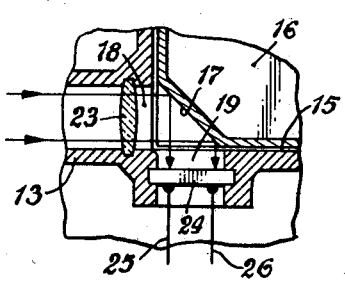
FIG. 4 is a partly sectional view similar to FIG. 3 but with a larger reflecting surface.

The embodiments of FIGS. 3 and 4 are provided with a magazine space 15 in a casing 13 of the motion picture camera having a cover 14. The magazine space 15 is adapted to receive a film magazine 16 having a reflecting area 17 on one of its corners. With the film magazine 16 inserted in the magazine space 15, this reflecting area 17 comes to lie adjacent two light apertures 18 and 19, arranged in two adjacent walls of the magazine space 15 which are perpendicular to one another.

In front of a picture window 20 may rotate a conical mirror shutter 21 arranged on a driven shaft 21A. During the dark periods of the film this conical mirror shutter 21 reflects light coming from the camera objective 1A to a mirror 22 in the camera casing from where the light is deflected in the form of a measuring light beam into a lens 23, arranged in the light aperture 18 and into the magazine space 15. In the horizontal light aperture 19 is positioned a photoelectric converter 24, the receiving surface of which faces the magazine space 15. The photoelectric converter 24 is connected by electric conductors 25 and 26 to other parts of the exposure control mechanism.

If there is no film maazine 16 inserted in the magazine space 15, the exposure control mechanism will not operate.

When a film magazine 16 is inserted in the magazine space 15, the reflecting surface 17 on the magazine reflects the measuring light beam entering the magazine space 15 downwardly toward the photoelectric converter 24 in the light aperture 19. Depending upon the size of the surface 17 (FIGS. 3 and 4), which is selected according to the type of film or film speed, either the entire measuring light beam or a part of it is reflected onto the receiving surface of the photoelectric converter 24. To obtain more variations, the degree of reflection of the reflecting surface 17 may additionally be varied.

Figure 5:
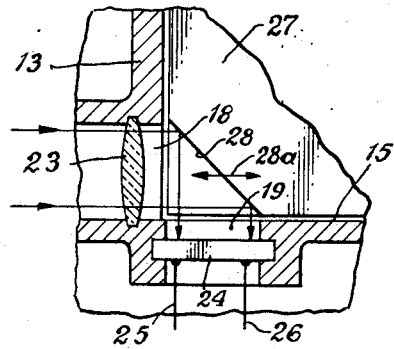
FIGS. 5 and 6 are partly sectional views like FIG. 4 with a reflecting surface variable in its position and constant in its size and inclination.
Figure 6:
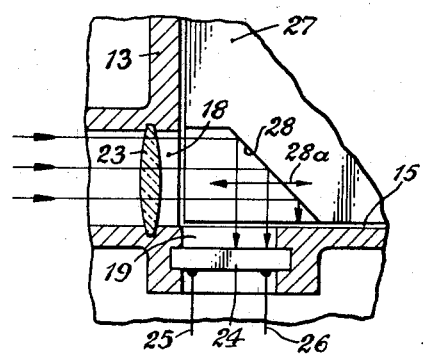

The embodiment according to FIGS. 5 and 6 is of the same construction as that of FIGS. 3 and 4. However, the film magazine 27 is here provided with a reflecting surface 28 the size of which is non-variable. The effect of the measuring light beam, however, is influenced by a displacement of the reflecting surface 28 with respect to the photoelectric converter 24. As shown by the double arrow 28a in FIGS. 5 and 6 this displacement takes place in a horizontal direction but may also take place in a direction perpendicular thereto.

Figure 7:
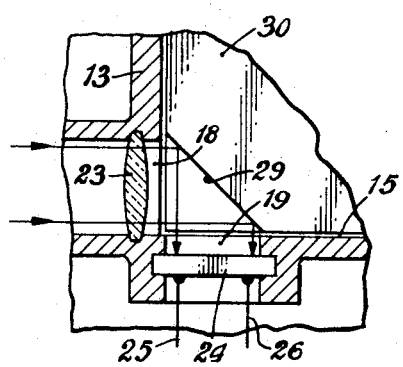
FIGS. 7 and 8 are partly sectional views like FIG. 4 with a reflecting surface variable in its inclination.
Figure 8:
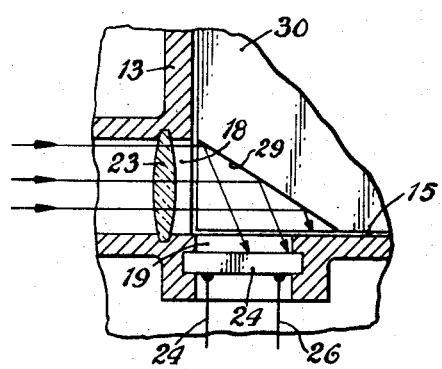

The embodiment illustrated in FIGS. 7 and 8 is the same as that of FIGS. 3 and 4. Here the reflection of the measuring light beam is brought about by a different inclination of a reflecting surface 29 arranged on a film magazine 30.

Also in the two last mentioned embodiments, the degree of reflection of the reflecting surfaces 28, 29 may of course vary.

Figure 9:
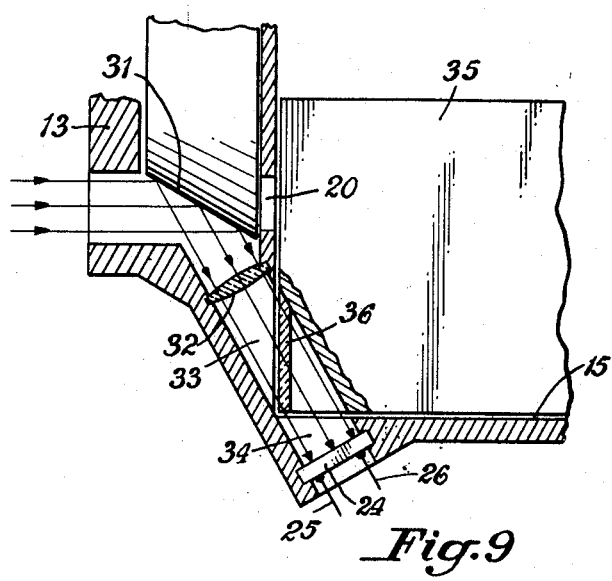
FIG. 9 is a partly sectional view like FIG. 4 showing a diaphragm or filter, respectively, near one edge of the film magazine.

The embodiment of FIG. 9 calls for a different constructure of the motion picture camera. Here the measuring light beam is obliquely reflected by a conical mirror shutter 31 having a different conical angle. The measuring light beam is directly reflected by the mirror on the shutter 31 through a lens 32 in a light aperture 33 to the photoelectric converter 24 arranged in the light aperture 34. Both light apertures 33 and 34 are arranged along an inclined axis disposed in the camera casing 13. The film magazine 35 is provided with a diaphragm or a filter 36 in the region of its edge which comes to lie in the lower left hand corner of the magazine space 15 through which passes the measuring light beam. When the parts 36 is a diaphragm, its measuring edge extending parallel to the drawing plane may be displaced perpendicularly to the drawing plane for the purpose of varying the size of the measuring light beam. When the part 36 is a filter, then the density of the latter will control the measuring light beam for introducing the film dependent value, such as the film speed, into the exposure meter.

What we claim is:

1. In combination with a photographic camera, a camera objective, an exposure measurement and exposure control device including a photoelectric converter and operated by light passing through the camera objective, and a film magazine provided at one of its edges with an inclined reflecting surface for introducing into that device a value related to the sensitivitiy of the film in the magazine, said inclined reflecting surface becoming operative for reflecting light passing through said camera objective onto said photoelectric converter when said film magazine is inserted into the camera.

2. The combination according to claim 1, in which the size and inclination of said reflecting surface on different selectively employable magazines is different in that with any given selected magazine only that portion of the measuring light beam which corresponds to the sensitivity of the film in the selected magazine is reflected onto said photoelectric converter.

3. The combination according to claim 1 in which said film magazine in the region of one of its edges and within its boundaries carries a diaphragm which when the film magazine is inserted into the camera becomes operative and determines the measuring light beam directed onto a photoelectric converter arranged in the camera, said diaphragm covering up a portion of said measuring light beam so that only that portion of said measuring light beam reaches said photoelectric receiver which corresponds to the sensitivity of the film in said magazine.

4. In combination with a photographic camera, a camera objective, an exposure measurement and exposure control device including a photoelectric converter, and a film magazine which carries within its boundaries a filter which when the film magazine is inserted in the camera becomes operative and influences the measuring light beam directed onto the receiving surface of said photoelectric converter, said filter absorbing a portion of said measuring light beam while the remaining portion corresponds to the sensitivity of the film in said magazine.

References Cited

UNITED STATES PATENTS

| | | | |
|---|---|---|---|
| 3,368,863 | 2/1968 | Mueller | 352—141 |
| 2,186,611 | 1/1940 | Martin. | |
| 3,351,413 | 11/1967 | Kond. | |
| 3,402,650 | 9/1968 | Hoadley. | |

NORTON ANSHER, Primary Examiner

JOSEPH F. PETERS, Jr., Assistant Examiner

U.S. Cl. X.R.

95—31; 352—72, 78